United States Patent [19]

Hoffrichter et al.

[11] 4,136,360
[45] Jan. 23, 1979

[54] APPARATUS INCLUDING A CIRCUIT ARRANGEMENT FOR ADJUSTING THE COLOR SIGNAL LEVELS OF A WHITE DOT

[75] Inventors: Ingo Hoffrichter, Kiel; Hans-Georg Knop, Heikendorf, both of Germany

[73] Assignee: Dr. Ing. Rudolf Hell GmbH, Germany

[21] Appl. No.: 732,404

[22] Filed: Oct. 14, 1976

[30] Foreign Application Priority Data

Oct. 14, 1975 [DE] Fed. Rep. of Germany ....... 2545961

[51] Int. Cl.² .............................................. H04N 1/40
[52] U.S. Cl. ...................................... 358/80; 358/280
[58] Field of Search ........................ 358/75, 76, 78, 80, 358/282, 280, 284

[56] References Cited

U.S. PATENT DOCUMENTS

| 2,607,845 | 8/1952 | Clark | 358/75 |
| 2,962,548 | 11/1960 | Taudt | 358/284 |
| 2,981,792 | 4/1961 | Farber | 358/75 |
| 3,515,803 | 6/1970 | Lorang | 358/282 |

FOREIGN PATENT DOCUMENTS

1386604  1975 United Kingdom ............ 358/80

*Primary Examiner*—John C. Martin
*Attorney, Agent, or Firm*—Hill, Gross, Simpson, Van Santen, Steadman, Chiara & Simpson

[57] ABSTRACT

Apparatus including a circuit arrangement for adjusting the color signal levels of a white dot in dot and line-wise reproduction of color picture patterns with a scanning instrument and in which for each color includes a photo converter for obtaining a color signal voltage and further including amplifiers receiving the output of each of the converters and wherein the gain of the converters and/or the amplifier are adjustable by means of a control signal through a regulating device. The circuit arrangement can be used not only in color scanners but also in black-white scanners.

5 Claims, 4 Drawing Figures

APPARATUS INCLUDING A CIRCUIT ARRANGEMENT FOR ADJUSTING THE COLOR SIGNAL LEVELS OF A WHITE DOT

BACKGROUND OF THE INVENTION

1. Field of the Invention

This invention relates in general to scanning and reproducing means such as for reproducing color and black and white patterns.

2. Description of the Prior Art

In reproduction processes for a black and white scanner used for obtaining from an original picture a reproduction which has been corrected and adapted for subsequent printing processes, it is necessary to convert the original picture into electrical information and subsequently form the reproduction from the information thus obtained.

For obtaining the electrical signal from an original picture, the picture is clamped onto a rotating scanning drum which is scanned dot-wise and line-wise by a light beam and depending on whether reflective original or a transparent original is to be produced the light is reflected or transmitted through the original picture and passes into a scanning instrument which is moved along parallel to the scanning drum and is converted electro-optically in the scanning device into the picture image signal. The picture image signal represents the tonal values of the scanned picture image dots. The entire tonal value scale is limited by the tonal values "white" and "black". By scanning a white spot of the original picture, the so-called white point dot which is the maximum picture image signal is generated whereas by scanning the blackest picture spot or point a so-called black point dot minimum image picture signal is generated.

The picture image signal is supplied into a gradiation stage in which a basic gradition which is dependent on the type of printing is accomplished and the printing process and the printing carrier are selected and the gradiation is varied for desired editorial changes in the redproduced picture relative to the original picture.

The image picture signal which is modified in the gradiation stage modulates the brightness of a recording lamp as the reproduction is made with the recording instrument. The recording carrier may be in the form of a film which is mounted on a recording drum which is also rotated and is exposed dot and line-wise to the recording lamp which is moved axially along the recording drum. The exposed and developed film is used for the reproduction of the printing picture or form.

The tonal values "white" and "black" are fixed end values on the gradiation curve or scale and for changing the tonal value curve of the reproduction from the original only the path of the curve between the end values "white" and "black" is changed. So as to establish these end values, normal voltage levels of the picture image signals are assigned to the tonal values "white" and "black" and such levels are designated as white level for the tonal value "white" and "black" lever for the tonal value "black". Since, however, the original pictures have different brightnesses and contrasts, different picture image signal voltages are derived during scanning of the white dots or, respectively, of black dots of the various picture originals. It is an object, therefore, to balance the picture image signal voltage to the white level or, respectively, to the black level before reproduction of an original picture.

On conventional scanners, the balancing or equalization is accomplished with the aid of potentiometers which are manually adjusted. For this purpose, a white dot of the original picture is placed under the scanning instrument and the picture image signal voltage is adjusted to the white level by manually rotating the potentiometer using a volt meter until the desired level is reached. Thereafter, a black dot of the original picture is scanned and the picture image signal voltage is adjusted to the desired black level by adjustment of an additional potentiometer by manually changing its settings.

These manual adjustments must be repeatedly checked and repeated since precise equalization and balancing can only be done approximately with the potentiometers which inter-relate to each other such that their influence effects each other.

A color scanner is used in the reproduction of a color picture original in order to produce corrected color separated signals from the picture original to be produced and the color separated signals in turn serve for producing printing forms of a color set for multicolor printing.

In a color scanner, the light reflected or transmitted by the color picture original is split up in the scanning instrument into three partial beams which are fed to different color channels. Color channels for color separation and electro-optical converters for obtaining three color signals are associated with the color channels with the three color signals representing the color portions of the scanned image dots such that the logarithmated color signals are proportional to the color densities.

For the purpose of color correction, the color signals are fed to a color computer which has an output comprising three corrected color separation signals for recording the color separations "Magenta" "Cyan" and "Yellow" are obtained. A color separation switch allows the color separated signals to be obtained one after another and supplied through a gradiation stage to a recording lamp whose brightness is modulated by the selected color separation signal. The recording of the color separations occurs by means of the dot and line-wise exposure of a film by means of the recording lamp. The exposed and developed film is the desired color separation.

In a color scanner before the recording of the color separations, the white level and the black level must be individually adjusted for each original picture to be reproduced. Additionally, the varying sensitivity of the individual color channels in the electro-optical conversion of the instant light into the color signal voltages must be taken into consideration.

It is a prerequisite for true-color reproduction that for the same intensity of the partial beams the color channels produces equal color signal voltages. Because of the differing characteristics of the color filters, electro-optical converters and amplifiers, this prerequisite is not met by systems of the prior art.

The partial beams of equal intensity are obtained during scanning of a neutral color picture spot which could be represented by way of example by a white dot, a black dot or a gray dot or surface. True color reproduction occurs then, for example, if a white part of the reproduced picture is also reproduced as a white tonal value without color cast. This condition is achieved when the color signal voltages for all color channels during the scanning of a neutral color portion of the picture are equalized or balanced to equal levels which preferably is the "white" level. For adjusting the color signal levels of the white dot and the black dot and for equalizing and balancing the sensitivity of the different color channels potentiometers are provided in color scanners of the prior art but such potentiometers influence each other as individual ones are adjusted and therefore make it necessary to periodically make adjustments for color correction.

In normalizing the color signal voltages, two different cases can be differentiated.

Number one, the color picture original has white and black portions, in other words, includes white and black dots.

In this case, all color channels' color signal voltages obtained by scanning of the white dot portion must be adjusted to the white level and the color signal voltages obtained by scanning the black dot portion must be adjusted to the black level. By normalizing all of the color signal voltages to the white level, special equalizing or balancing of the color channels to equal sensitivity is eliminated.

For carrying out this objective, the operator must separately measure each of the color signal voltages with a volt meter for each color channel and must then equalize or balance ach channel by rotating the control knobs of the different potentiometers.

Condition two is where the color picture original includes no white or black portions. In such a case, the lightest portion of the picture is selected to represent the "fictitious white dot" and the darkest part of the portion is selected to represent the "fictitious black dot". The fictitious white and black dots differ from pure white or black dots by color cast.

If this color cast is to be eliminated during reproduction, for example, the lightest or brightest color portion of the picture is to be reproduced as purely white or black area of the picture, then the varying color signal voltages obtained during the scanning of the, for example, fictitious white dot must be normalized to the white level and the color signal voltages obtained during scanning of the fictitious black dot must also be normalized to the black level. The objectives under case two, are then the same as those that exist under the first condition described above.

If, on the other hand, the original picture is to be reproduced true to color, then the following process must be accomplished.

First, the previously described equalization and balancing of the differing sensitivities of the color channels must be accomplished wherein a neutral color gray surface is scanned and the color signal voltages obtained therefrom are equalized or balanced to the same level preferably to the white level by changing the gains of the individual color channels.

Then the fictitious white dot of the original picture is scanned while maintaining the previously adjusted gain rates and three different color signal voltages are generated depending on the color composition of the fictitious white dot with one of the color signal voltages maintained at a maximum level. The maximum color signal voltage is raised to the white level. For a true color reproduction, however, the relationship between the three color signal voltages representing an image dot must also be maintained so that after the adjustment of the maximum color signal voltage to the white level, the other two color signal voltages are also raised proportionally by a correctional factor which is equal to the quotient of the white level and the maximum value.

Subsequently, adjustment of the color signal levels for the black dot scanning is accomplished.

For adjusting the color signal levels of the white dot, the operator thus initially has to measure all of the color signals voltages with a volt meter and determine the maximum value and calculate the correctional factors. Then with the aid of the calculated correctional factors, he must determine the values to be adjusted and must then set such values by the rotation of the control knobs of the potentiometers. Since the potentiometers for equalizing and balancing to the white level, and the black level, each influence each other the adjustments must be repeatedly checked and, if necessary, changed which requires a substantial amount of time for such control.

For economical utilization of scanning devices, however, it is necessary and desirable that the adjustment time for a reproduction process be as short as possible relative to the actual reproduction time. Thus, shorter adjustment times can only be accomplished if as many adjustments as possible are automatically accomplished.

Attempts have previously been made to replace the manually controlled potentiometers necessary for the level balancing and equilization with motor control potentiometers. The use of such motor control potentiometers, however, does not result in success since the time for setting the potentiometers with a motor is not substantially less than that using the conventional methods. This is particularly true because the setting must be made with a high degree of accuracy.

SUMMARY OF THE INVENTION

The present invention relates to apparatus and circuitry for the setting of color signal levels for the white dot.

The invention has a primary objective of providing a circuit arrangement for automatically adjusting and setting the color signal levels of the white dot and wherein the adjustment time is substantially shortened over those of the prior art and wherein the operator of the apparatus is relieved of routine jobs and can concentrate on other tasks relating to the reproduction technique such as, for example, color correction.

In the invention, a regulating member receives a control signal from a voltage comparator which receives a desired nominal value signal and the actual value of a color signal input and supplies an output to a high voltage generator which adjusts the color signal levels so as to automatically obtain the correct color signals for the different channels.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
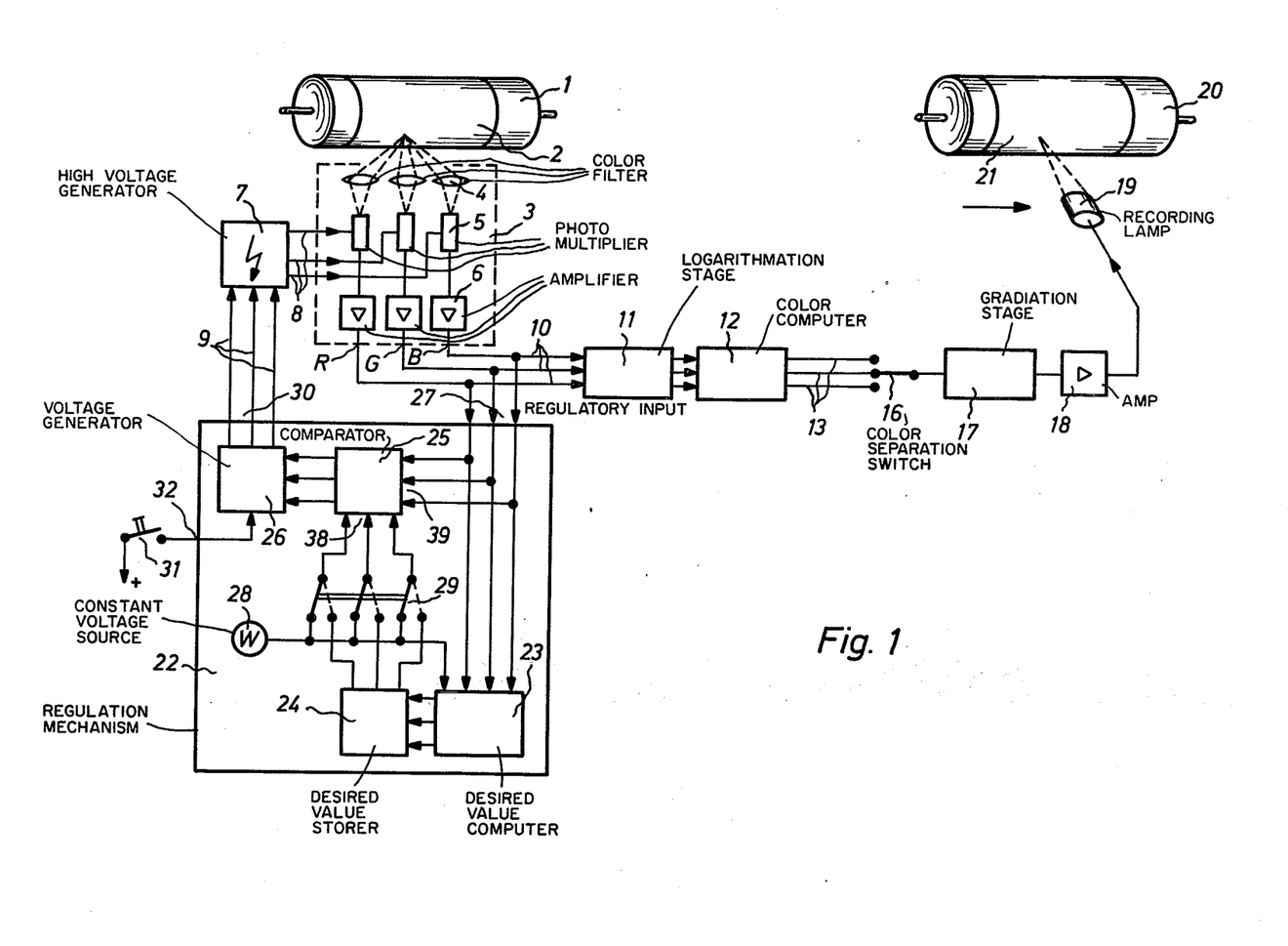
FIG. 1 is a block circuit diagram of a color scanner with the circuit of the invention for setting the color signal levels for the white dot.

FIG. 1 illustrates a drum 1 which is rotated by a suitable drive motor and upon which a color original picture 2 is mounted for reproduction. A scanning instrument 3 is mounted so as to move axially relative to the drum and picture 2 so as to scan dot-wise and line-wise the picture. A light source not shown is reflected or transmitted through the original picture so that the picture modulates the light beam after which it is received in the scanning instrument 3 and is split up into three partial beams which are each passed through different color filters 4 and into photo multipliers which receive the light from each of the color filters 4 and to color amplifiers 6 for each channel. For example, one channel might convert the color information of the scanned picture image dots into the blue signal at the output of the amplifier 6. The second filter photo multiplier and amplifier may convert the scanned picture image dot into the green color signal and the third filter photo multiplier and amplifier 6 may convert the scanned color dots into the red color signal. These signals are respectively indicated by B, G and R at the output of the amplifier 6 in FIG. 1.

A high voltage generator 7 produces output voltages on lines 8 which are connected to the photo multipliers 5 so as to control the gain factor of the photo multipliers. These output voltages from the high voltage generator 7 are determined by the control voltages supplied on three lines 9 received from a regulating apparatus 22 where the control signals for controlling the signal level of the color signal voltages are produced.

The output of the amplifiers 6 comprising the three color signals R, G and B are supplied through lines 10 to a logarithmation stage 11 and are converted into the color signal voltages having values proportional to the color density. A color computer 12 receives the outputs of the logarithmation stage 11 and accomplishes color correction. The output of the color computer 12 comprises three corrected color separated signals comprising "Magenta (Ma), Cyan (Cy) and Yellow (Ye)". The color separated primary signals are fed through lines 13 to a color separation switch 16. The color separation switch 16 allows one of the color separated signals to be connected for recording the corresponding color separated signal on the film 21 dot-wise and line-wise. For example, as shown in FIG. 1, switch 16 is connected to the middle line 13 which carries the Cyan primary signal and the switch 16 supplies it to a gradiation stage 17 thru which it is supplied to an amplifier 18 and to the recording lamp 19 which has its brightness modulated by the color separation signal. The recording lamp 19 moves axially along the scanning drum 20 on the which the mounted film 21 is mounted so as to dot-wise and line-wise record on the film 21 the information from the color computer 12. A motor means not shown periodically rotates the drum 20 so that additional dots and lines can be exposed with the recording lamp 19 as it moves back and forth along the drum. The resulting exposed film after development will comprise the desired color separation results.

As described above, the adjustment of the color signal levels is accomplished before recording of the color separations by scanning a real or fictitious white dot.

In the present invention, for this purpose, a regulating mechanism or device 22 which includes a desired value computer 23 for computing the nominal desired set value is provided which supplies an output to a storage means 24 for storing the desired set value. A comparator 25 receives the B, G and R signals from the output of the amplifiers 6 which signals are also supplied to the desired value computer 23. The comparator 25 produces three output signals which are supplied to the voltage generator 26 which provides three outputs on lines 30 to the high voltage generator 7 for controlling the three photo multipliers 5 in the scanning device 3. The signals on lines 10 serve for regulating the output of the comparator 25.

A constant voltage source 28 supplies an input to the desired value computer 23 and to terminals of a switch 29. The switch 29 allows the comparator 25 to be connected either to the constant voltage source 28 or to the outputs of the desired value storer 24.

In order to raise all three color signal voltages of the white dot to the white level which is necessary for a true color reproduction of an original picture having a real white dot, for color cast compensation in the case of a fictitious white dot and for balancing and equalizing the different sensitivities of the color channels a desired nominal set value corresponding to the white level W is supplied from the constant voltage source 28 through switch 29 to the comparator 25 when the switch 29 is in the position shown in FIG. 1.

For true color reproduction of an original picture containing a fictitious white dot the desired nominal set value of computer 23 first determines from the regulatory variables the maximum value of the color signal voltages of the white dot and from this information and from the preset white level produces a signal indicative of the correctional factor. By multiplying the color signal voltages of the white dot with the correctional factor, the desired nominal set values for the regulatory operation are calculated and are supplied as inputs into the desired nominal set value storer 24. The desired nominal set values are fed to the computer 25 through the switch 29 which at this time will have its movable contacts moved to the position shown in dotted line in FIG. 1.

The comparator 25 compares the desired nominal set values of the white level W or the calculated desired nominal set values with the actual values of the color signal voltages of the white dot appearing on lines 10 and produces output voltages for controlling the voltage generator 26 at the output of the comparator 25. The voltage generator 26 will generate control signals associated with the three different color channels which control signals are fed from the regulating output 30 of the regulating device 22 through lines 9 to the high voltage generator 7 which regulates the gain of the different color photo multipliers 5. The control signals supplied to the photo multipliers 5 control the operating voltages which determines the degree of gain and thus controls the amplification factor of the photo multipliers 5.

A button switch 31 initiates the regulating operation by supplying a control signal as, for example, a plus voltage as a command input 32 to the regulating device 22.

After the regulation operation has been accomplished and during reproduction the voltage generator 26 delivers constant control level signals to the photo multipliers 5 so as to hold the gain and amplification factors of the photo multipliers constant.

It is to be realized, of course, that it is within the scope of this invention to have the output of the high voltage generator 7 connected to the gain control terminals of the amplifiers 6 rather than to the photo multipliers 5 so as to control the output signals on lines 10. This would be understood by those skilled in the art in that the desired control signals which are to be used for reproduction appear on lines 10 and whether the regulation occurs in the amplifiers or in the photo multipliers would give the same results.

It is also in the scope of this invention, of course, that the output of the logrithmation stage 11 were to be used as the regulatory inputs supplied to the desired value of computer 23 rather than the outputs of the amplifier 6. Alternatively, the output of the color computer 12 appearing on leads 13 could be supplied to the desired value computer 23 so as to provide the control signals for the generator 7.

It is also to be understood that more than three photo multipliers can be used in the scanning device 3 such as, for example, for scanning the outer field of the original picture but such additional photo multiplier is not illustrated. Such additional scanning and further photo multipliers could also be controlled by the regulating device 22.

Figure 2:
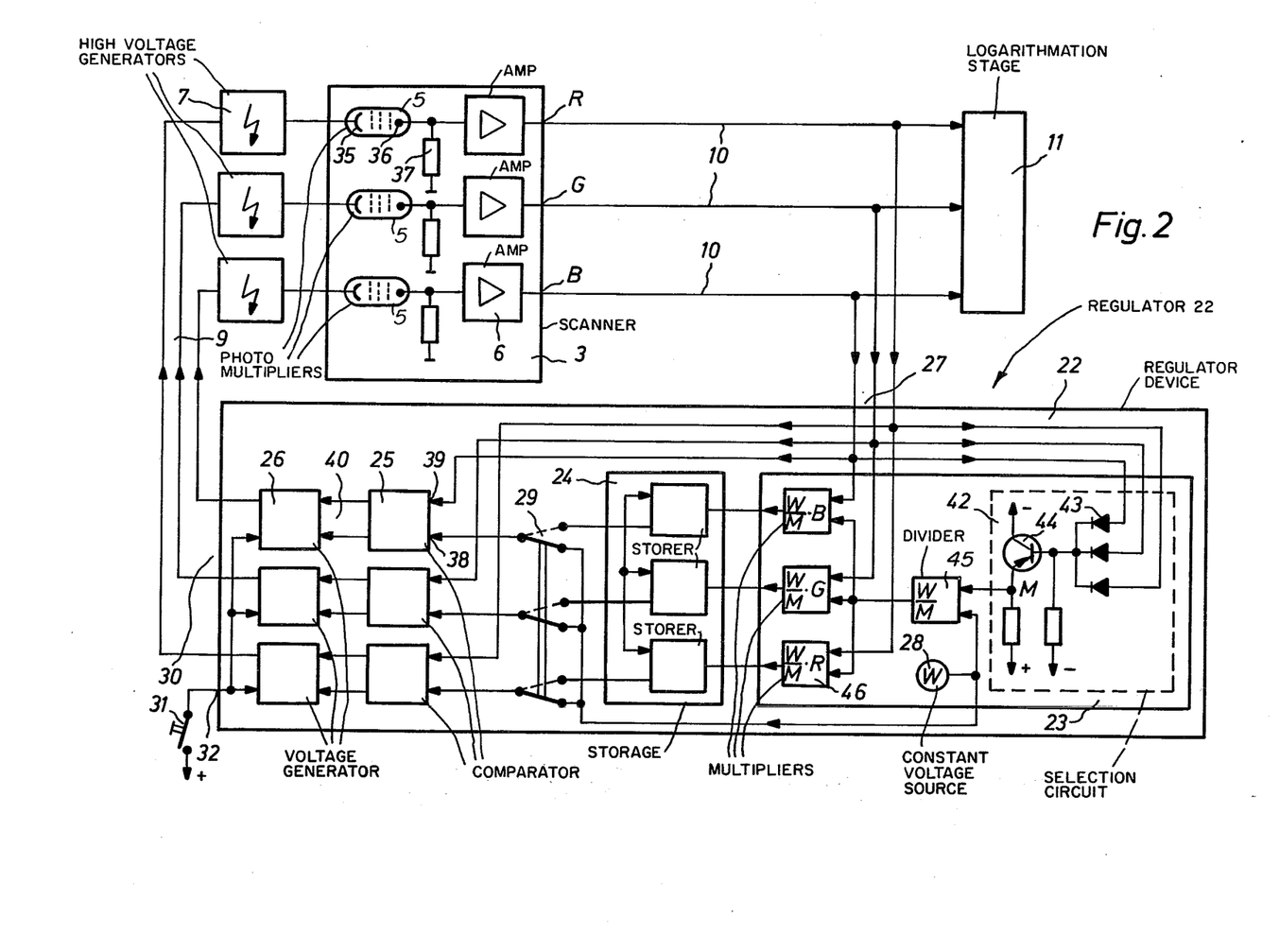
FIG. 2 is a detail block diagram of a portion of the invention illustrated in FIG. 1.

FIG. 2 is a detailed circuit arrangement of the regulating device 22 and for more complete explanation the scanning device 3 including the photo multipliers 5 and the amplifiers 6 as well as the high voltage generator 7 and the logarithmation stage 11 and output leads 10 are illustrated.

The output of the high voltage generator 7 comprises three signals and these signals are, respectively, supplied to the cathodes 35 of the three photo multipliers 5. The dynode voltage dividers are not illustrated since these are well known to those skilled in the art. The anodes 36 of the photo multipliers 5 are connected to ground potential through load resistors 37. The output color signal voltages are supplied across the load resistors 37 to the amplifiers 6 and the color signal voltages appearing across the resistors 37 are the voltages which are to be regulated.

The regulating device 22 operates as follows. For balancing and equalizing the color signal voltages of the white dot to the white level W the switch 29 is placed in the solid line position shown in FIG. 2 and the constant voltage source 28 is connected to the desired set value input 38 of the comparator 25. The constant voltage source 28 produces in this case a voltage which is identical to the normalized white level W. The actual value inputs 39 to the comparator 25 are connected to the input 27 which is to be regulated by the regulating device 22. The color signal voltages from lines 10 are supplied to the regulatory input 27 and these signals are formed either by scanning a real white dot or in the case for color cast compensation by scanning of a fictitious white dot. The voltage generators 26 are initially turned on at the start of regulation by closing the button switch 31. If the desired nominal set value appearing at one of the comparators 25 is greater than the desired actual value this particular comparator 25 will supply through one of the lines 40 a voltage to the associated voltage generator 26 which will generate a control signal with a rising voltage curve. If, however, the desired nominal set value is smaller than the actual value, the voltage generator 26 will produce a control signal with a falling voltage curve. The rising and falling voltage curves may be linear, for example. These control signals of the voltage generators 26 control the gain and the degree of amplification of the photo multipliers 5 by controlling the outputs of the high voltage generators 7.

When the inputs to the comparator 25 are equal at one of the comparators 25, the voltage generator 26 is stopped with its output voltage at the voltage at that point and the control signal level will be retained.

For a true color reproduction, the degree of amplification of the photo multipliers 5 must initially be adjusted with the regulating device 22 such that when a gray surface is scanned all color signal voltages are at the white level. For this purpose, the switch 29 is again positioned to that illustrated in solid line in FIG. 2 and the white level is present at the desired nominal set value inputs 38 of the comparators 25. In this condition, the regulating operation is accomplished as described above.

Then, while maintaining the selected gain factors and the amount of amplification, the fictitious white dot of the original picture is scanned from which depending on the color composition three different color signals are formed. These color signals appear on lines 10 and are supplied to a selection circuit 42 of the desired value computer 23 for determining the maximum value. The lines 10 are respectively connected to the anodes of three diodes 43 which have their cathodes connected in common and to the base of a transistor 44 which is connected as an emitter-follower. The diode 43 which receives the largest color signal voltage becomes conductive and the maximum voltage decreased by the voltage drop across the diode is supplied to the base of the transistor 44. Since the emitter-follower compensates the voltage loss and in addition the temperature drift of the diodes 43, the maximum value M of the color signal voltages will appear at the output of the selection circuit 42 and will be fed to a divider 45. The divider 45 produces a correctional factor signal which is the quotient of the white level W received from the constant voltage source 28 and the maximum value signal M appearing at the output of the transistor 44 on the emitter. Three multipliers 46 respectively receive the three color signals on lines 10 and the correctional factor from the output of divider 45. Each of the multipliers 46 multiplies the respective color signal voltages R, G and B with the correctional factor W/M. The outputs of the multipliers 46 are respectively supplied to three different storage regions of the desired value storer 24.

The desired value storer 24 can, for example, be an analog memory storage device and may be constructed of sample and hold circuits such as type HA 2425 manufactured by Harris Semiconductors. A circuit of this type is commercially available and known to those skilled in the art and, thus, the description of the structure and mode of operation of such storage devices is not necessary.

After the desired set nominal value compensation has occurred, the regulating operation takes place and for this purpose the switch 29 is moved to the position shown in dotted line in FIG. 2 so that the output of the desired value storer 24 comprising the stored desired set nominal values are applied as the set nominal value inputs 38 to the comparators 25. When regulation is commanded by closing the switch 31, regulation operation is initiated and the maximum color signal voltage of the white dot will be raised to the white level and the other two color signal voltages of the white dot are proportionally raised. It is seen from the foregoing description, that the entire adjustment operation can be accomplished very fast in that only time necessary for scanning the relevant picture dots in the original pictures and for pressing the buttons to initiate regulation is required.

Figure 3:
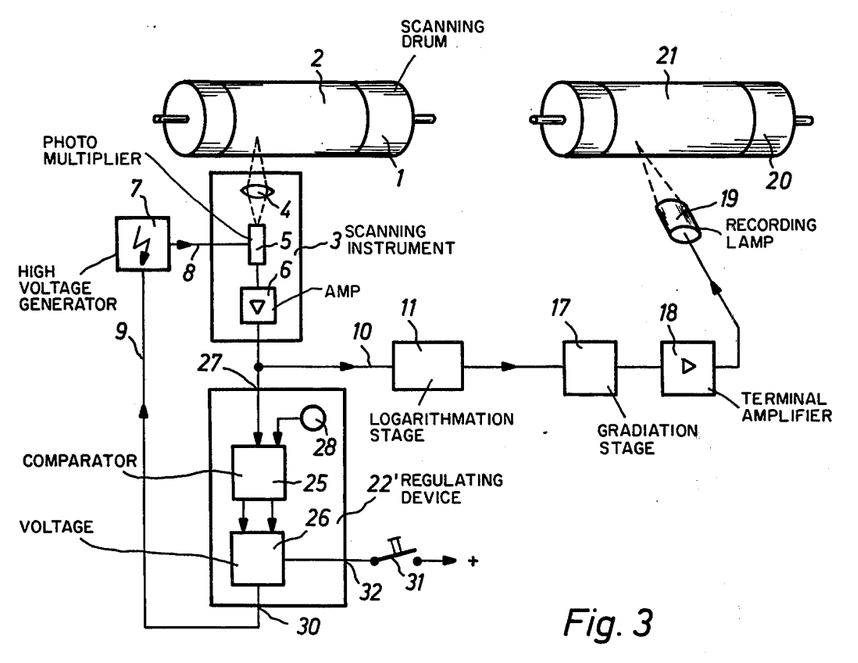
FIG. 3 is a block circuit diagram for a black-white scanner having a simplified circuit for adjusting and setting the white level.

FIG. 3 illustrates a simplified example of the circuit of the invention for adjusting the white level in a black-white scanner.

A black-white scanner comprising a scanning drum 1 which is driven by a suitable motor has mounted thereon a black and white original picture 2 which is to be reproduced. The picture is scanned dot and line-wise by the scanning instrument 3 by moving it longitudinally of the rotating drum and picture 2. The scanning instrument 3 contains a photo multiplier 5 and an amplifier 6 which electro-optically converts the picture image on the picture 2 into a picture image signal which varies as a function of the light received by the scanning instrument 3. The control operating voltage for the photo multiplier tube 5 is supplied from a high voltage generator 7 through the line 8. The operating voltage is controlled in the high voltage generator 7 by way of a line 9 from the voltage generator 26 of the regulating device 22'. The output amplifier 6 is supplied through line 10 to a logarithmation stage 11 which supplies an output to the gradation stage 17. The image picture signal is modified in the gradation stage 17 and passes through the terminal amplifier 18 to the recording lamp 19 which has its brightness modulated by the modified image picture signal. The recording lamp 19 is scanned dot and line-wise to expose the film 21 which is mounted on the recording drum 20 which is driven by a suitable driving means not shown so as to accomplish line by lines and dot by dot scanning.

For equalizing the white level, a regulating device 22' is provided which can be substantially simpler than the regulating device 22 illustrated in FIG. 2. The signal to be regulated is supplied from line 10 to the regulator input 27 which supplies it to the comparator 25. The desired set nominal value to which the signal is compared is the white level W from the reference source 28. The voltage generator 26 receives the output of the comparator 25 and supplies an output control signal to the output regulating terminal 30 of the regulating device 22' which is supplied by line 9 to the high voltage generator 7 to control its output.

Figure 4:
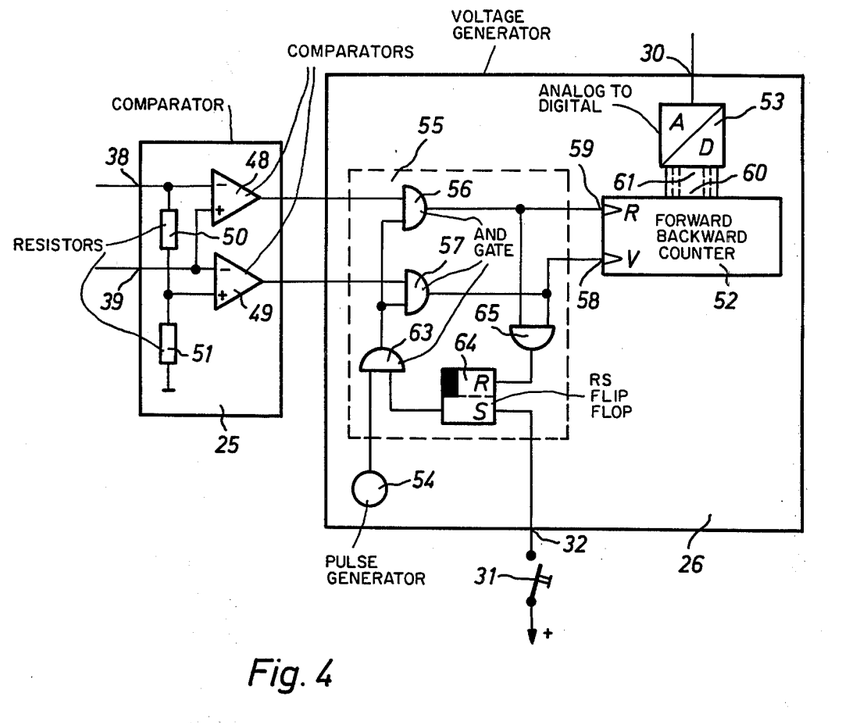
FIG. 4 is a block diagram illustrating a sample embodiment of a comparator and a voltage generator.

FIG. 4 illustrates a sample embodiment of the comparator 25 and the voltage generator 26. The comparator 25 comprises two comparators 48 and 49. The non-inverting input of the comparator 48 and the inverting input of the comparator 49 are connected in common to the actual value input 39 of the comparator 25. The inverting input of the comparator 48 is connected to the desired set nominal value input 38 of the comparator 25 through a resistor 50 to the non-inverting input of the comparator 49. This input is also connected to ground through a further resistor 51.

The ratio of the resistors 50 and 51 determine a desired set nominal value range for the comparator 25.

The comparators are, for example, type LM 311 manufactured by National Semiconductor. These components supply TTL output level, so that they can be directly combined with logic circuits.

The voltage generator 26 consists essentially of a forward-backward counter 52, a digital/analog converter 53, a pulse generator 54 and a control circuit 55.

The outputs of the comparators 48 and 49 of the comparator 25 are connected to AND gates 56 and 57 of the control circuit 55. The output of the AND gate 56 is connected to the backward counting input 59 of the forward-backward counter 52 and the output of AND gate 57 is connected to the forward counting input 58 of the forward-backward counter 52.

The data outputs 60 of the forward-backward counter 52 are connected to the digital input 61 of the digital/analog converter 53 which produces an analog output 30 of the voltage generator 26 as shown in FIG. 3.

At the output 30, a control signal appears which is proportional to the counter reading of the forward-backward counter 52 and this control signal can be changed by counting in and counting out pulses of a counting pulse sequence into or out of respectively of the forward-backward counter 52.

The counting pulse sequence is generated in the pulse generator 54. The pulse generator 54 is connected by way of AND gate 63 and through AND gates 56 and 57 of the control circuit 55 to the forward-counting input 58 or alternatively to the backward-counting input 59 of the forward-backward counter 52. Depending on the output levels of the comparators 48 and 49, the counting pulse sequence passes either to the forward counting input 58 or to the backward counting input 59 of the forward-backward counter 52.

The voltage generator 26 is switched on by actuating the button 31 which supplies a positive voltage at terminal 32. This causes an RS flip-flop 64 of the control circuit 55 to change the Q output of the RS flip-flop 64 so it passes into the H regiion and the AND gate is enabled. The counting pulse sequence can then pass to the counting inputs of the forward-backward counter 52.

The mode of operation of the comparator 25 and the voltage generator 26 is as follows. If the actual value, for example, be smaller than the nominal desired set value, then the output of the comparator 49 is in the H region and the output of the comparator 48 is in the L region. The AND gate 57 will be enabled and the counting pulse sequence from the counter 54 will pass to the forward-counting input 58 of the forward-backward counter 52 which causes the counter reading to be constantly increased and the control signal appearing at the output 30 of the digital/analog converter 53 will rise linearly.

If the actual value is equal to the desired nominal set value, then the outputs of both the comparators 48 and 49 will be in the L region and the AND gates 56 and 57 will be blocked. The counter reading of the forward-backward counter 52 and the already attained value of the control signal will be retained at this fixed value.

In this condition, the output of an AND gate 65 of the control circuit 55 and the R input of the RS flip-flop 64 pass into the L region. The RS flip-flop 64 will be reset and the voltage generator 26 will be switched off.

It would also be possible to use a forward-counter instead of the forward-backward counter 52. In this event, the forward counter would have to be started and stopped depending on the output levels of the comparators 48 and 49. The voltage generator 26 could also be constructed as a saw-tooth generator or a staircase wave form generator with an analog storage memory connected therewith.

It is seen that this invention provides a novel means for regulating and controlling the scanning and reproduction of color and black and white pictures. Although the invention has been described with respect to preferred embodiments, it is not to be limited as changes and modifications may be made which are within the full intended scope as defined by the appended claims.

We claim as our invention:

1. Apparatus for adjusting the color signal levels of a white dot in reproduction of color original pictures with a scanning means, in which for each color separation a photo-electric converter and amplifier are provided, the amplification factor of the converter and/or the amplifier is adjustable by a control signal, wherein for each color signal component of a color separation a comparator is provided, having an actual value input and a desired value input, said actual value inputs of the comparators comprise the color signal components, said desired value inputs of the comparators are connectable through a transfer switch to the setting means of a constant voltage source for the adjustment of the color signal components to a common level corresponding to the level of said constant voltage source, and said desired value inputs are connectable, for adjusting the color signal components to values necessary for producing a true color reproduction, to a storage device containing said necessary values, wherein a desired value computer supplying inputs to the storage device and calculating the desired values from the actual values of the color signal components of the white dot and the white level, said computer is connected to the outputs of the amplifiers and to a constant voltage source, and wherein for each color signal component a voltage generator is provided, receiving the output of an associated comparator, each voltage generator during the adjustment of the color levels produces at its output a changing voltage as a control signal when unequal input values of the comparator exist, and, when the input values are equal locks onto and holds the instantaneous voltage value existing during reproduction.

2. Apparatus according to claim 3 wherein the desired value computer includes a maximum selection circuit for the color signal voltages, a divider connected to the maximum selection circuit and to said constant voltage source for the white level, said divider calculating a quotient from the white level and the maximum color signal voltage, and a plurality of multipliers corresponding to each color component signal voltage receiving the output of said divider and the color component signals, for the formation of the product from the quotient and the corresponding color component signal and wherein the outputs of said multipliers constitute the outputs of the desired value computer.

3. Apparatus for adjusting the color signal component levels of a white dot in the reproduction of color original pictures with a scanning means having multichannel color reproductions means with each channel receiving and amplifying different color information and having independent gain control means, including a comparator receiving the different multichannel color information, an adjustable constant value source also supplying an input to said comparator, a voltage generator receiving a number of outputs from said comparator corresponding to the number of color channels and supplying a number of outputs corresponding to the number of color channels respectively to said gain control means of each channel, including a desired value computer receiving the different multichannel color information and said output of the constant value source, and switching means for disconnecting the output of said constant value source from said comparator and connecting the output of said desired value computer to said comparator.

4. Apparatus according to claim 3 including a storage means connected between said desired value computer and said switching means.

5. Apparatus according to claim 3 wherein said voltage generator includes an upward-downward counter.

* * * * *